United States Patent
Rowe et al.

(10) Patent No.: US 7,082,838 B2
(45) Date of Patent: Aug. 1, 2006

(54) EXTRAORDINARY PIEZOCONDUCTANCE IN INHOMOGENEOUS SEMICONDUCTORS

(75) Inventors: Alistair C. H. Rowe, Sains en Amienois (FR); Stuart A. Solin, St. Louis, MO (US)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/626,403

(22) Filed: Jul. 24, 2003

(65) Prior Publication Data

US 2004/0129087 A1 Jul. 8, 2004

Related U.S. Application Data

(63) Continuation-in-part of application No. 09/652,821, filed on Aug. 31, 2000, now Pat. No. 6,714,374, and a continuation-in-part of application No. 09/796,304, filed on Feb. 28, 2001, now Pat. No. 6,937,967.

(60) Provisional application No. 60/398,391, filed on Jul. 25, 2002.

(51) Int. Cl.
*G01L 1/00* (2006.01)
*G01B 7/16* (2006.01)

(52) U.S. Cl. .................................... 73/777
(58) Field of Classification Search ............... 73/805, 73/777; 257/415, 192, 275, 421, 254, 43; 333/104
See application file for complete search history.

(56) References Cited

U.S. PATENT DOCUMENTS

| | | | |
|---|---|---|---|
| 3,913,213 A * | 10/1975 | Mills et al. | 438/328 |
| 4,245,230 A * | 1/1981 | Kwok et al. | 257/275 |
| 4,322,695 A * | 3/1982 | Fleming et al. | 333/104 |
| 4,725,877 A * | 2/1988 | Brasen et al. | 257/751 |
| 5,012,304 A * | 4/1991 | Kash et al. | 257/18 |
| 5,526,703 A * | 6/1996 | Aslam et al. | 73/862.68 |
| 5,663,507 A | 9/1997 | Westervelt et al. | |
| 6,034,404 A * | 3/2000 | Soares | 257/415 |
| 6,066,561 A * | 5/2000 | Kumar et al. | 438/689 |
| 6,338,275 B1 * | 1/2002 | Soares | 73/805 |
| 6,570,750 B1 * | 5/2003 | Calcatera et al. | 361/115 |
| 6,707,122 B1 * | 3/2004 | Hines et al. | 257/421 |

OTHER PUBLICATIONS

C.A. Mead, et al.; "Fermi Level Position at Metal-Semiconductor Interfaces"; *Physical Review*; vol. 134; No. 3A; pp. A713-A716; (1964).

G. Margaritondo; "Interface states at semiconductor junctions"; *Rep. Prog. Phys.*; vol. 62; pp. 7650-7808; (1999).

(Continued)

*Primary Examiner*—Max Noori
*Assistant Examiner*—Octavia Davis
(74) *Attorney, Agent, or Firm*—Scully, Scott, Murphy & Presser, P.C.

(57) ABSTRACT

Extraordinary piezoconductance, or change in conductance with strain or pressure, is observed in a hybrid metal-semiconductor device formed from a semiconductor thin film and an adjacent metal shunt fabricated on a semi-insulating substrate. The device includes electrodes for applying a current to the device and for measuring a resulting induced voltage. Strain that is induced in the device, including at the interface between the semiconductor and the metal shunt, changes the resistance at the interface. The device can be used to measure strain or environmental conditions such as pressure or temperature. A sensor using the device includes a frame with a thin membrane on which the device is carried. Deformations in the membrane are transferred to the device to induce strain in the device.

29 Claims, 9 Drawing Sheets

OTHER PUBLICATIONS

C.S. Gworek, et al.; "Pressure dependence of Cu, Ag, and Fe/n-GaAs Schottky barrier heights"; *Phy. Rev.B*; vol. 64; pp. 045322-1-045322-6; (2001).

Peter Van Vessem et al.; "Rediscovering the Strain Gauge Pressure Sensor"; *Sensors*; 8 pps.; (1999).

Adhesives List printed from www.tokyosokki.co.jp/e/product . . . ; on Jun. 27, 2003.

Fujidura Semiconductor Pressure Sensors printed from www.fujidura.co.jp/sensor/press/intro . . . on Jun. 27, 2003.

Y. Ohmura; "Piezoresistance Effect in p-Type Semiconductors Si and Ge"; 21st International Conference on The Physics of Semiconductors; vol. 1; pp. 273-276; (1992.

T. Zhou, et al.; "Extraordinary magnetoresistance in externally shunted van der Pauw plates"; *Applied Physics Letters*; vol. 78; No. 5; pp. 667-669; (2001).

S.A. Solin, et al.; Nonmagnetic semiconductors as read-head sensors for ultra-high-density magnetic recording:, *Applied Physics Letters*; vol. 80; No. 21; pp. 4012-4014; (2002).

A.C.H. Rowe, et al.; "A uniaxial tensile stress apparatus for temperature-dependent magnetotransport and optical studies of thin films"; *Review of Scientific Instruments*; vol. 73; No. 12; pp. 4270-4276; (2002).

S.A. Solin, et al.; "Enhanced Room-Temperature Geometric Magnetoresistance in Inhomogeneous Narrow-Gap Semiconductors"; *Science*; vol. 289; pp. 1530-1532; (2000).

* cited by examiner

EXTRAORDINARY PIEZOCONDUCTANCE IN INHOMOGENEOUS SEMICONDUCTORS

CROSS-REFERENCE TO RELATED APPLICATIONS

This application: (1) is a continuation-in-part of U.S. patent application Ser. No. 09/652,821, filed Aug. 31, 2000, now U.S. Pat. No. 6,714,374, entitled "Magnetoresistive sensor, magnetoresistive head and magnetic recording/reproducing apparatus,"(2) is a continuation-in-part of U.S. patent application Ser. No. 09/796,304, filed Feb. 28, 2001, now U.S. Pat. No. 6,937,967, entitled "Method and system for finite element modeling and simulation of enhanced magnetoresistance in thin film semiconductors with metallic inclusions"; and (3) claims the benefit of U.S. provisional patent application No. 60/398,391, filed Jul. 25, 2002, and entitled "Extraordinary Piezoconductance In Inhomogeneous Semiconductors, Application To High Sensitivity, Solid State Pressure And Temperature Sensors".

BACKGROUND OF THE INVENTION

1. Field of Invention

The invention relates generally to a semiconductor device that exhibits extraordinary piezoconductance, or increased conductance under pressure/strain, and to a sensor using such a semiconductor device.

2. Description of Related Art

Inhomogeneous semiconductors have previously been shown to exhibit extraordinary magnetoresistance (EMR), as discussed in S. A. Solin et al., "Enhanced Room-Temperature Geometric Magnetoresistance in inhomogeneous Narrow-Gap Semiconductors", Science, vol. 289, pp. 1530–1532, Sep. 1, 2000. This effect derives from magnetic field induced changes in the conductive boundary conditions at an internal metal (shunt)/semiconductor interface within the device. Fabrication of galvanomagnetically equivalent externally shunted planar structures (EMR plates), discussed in T. Zhou et al., "Extraordinary magnetoresistance in externally shunted van der Pauw plates," Appl. Phys. Lett. Vol. 78, pp. 667–669, Jan. 29, 2001, is far cheaper than the initially studied internally shunted circular geometry, and when scaled to nanoscopic size, as discussed in S. A. Solin et al., "Nonmagnetic semiconductors as read-head sensors for ultra-high-density magnetic recording," Appl. Phys. Lett., vol. 80, no. 21, pp. 4012–4014, May 27, 2002, these devices show great promise as nonmagnetic read head sensors for magnetic storage media. Macroscopic EMR plates also have a number of large volume applications in the automotive and other industries such as position sensing of rotating parts.

Here we disclose a new effect observed in macroscopic EMR plate structures that were originally designed as test devices for the EMR effect. The new effect consists of a large increase in the conductance of the EMR plates in the presence of an applied strain. Like EMR, the origin of the effect lies in changes to the conductive boundary conditions at the metal/semiconductor interface under an external perturbation (in this case strain) as will be shown using a finite element analysis of the EMR plates. This effect, which we dub extraordinary piezoconductance (EPC), produces enhancements in the piezoconductance of almost an order of magnitude compared with the response of homogeneous semiconducting material.

BRIEF SUMMARY OF THE INVENTION

The present invention describes a hybrid semiconductor device that exhibits extraordinary piezoconductance, and a solid-state sensor for employing the device, e.g., for sensing strain, pressure or temperature. Due to the extraordinary piezoconductance, the sensor is highly sensitive and therefore provides many performance advantages relative to existing designs.

In one aspect of the invention, an apparatus for measuring strain includes a semiconductor film and an adjacent metal shunt forming an interface therebetween, where a strain induced at least at the interface changes a resistance at the interface.

In a further aspect of the invention, a method for measuring strain includes applying a constant current to a hybrid semiconductor device comprising a semiconductor film and an adjacent metal shunt forming an interface therebetween to induce a voltage in the hybrid semiconductor device, inducing a strain at least at the interface to change a resistance at the interface, and measuring a change in the voltage that is indicative of the change in the resistance.

In a further aspect of the invention, a method for fabricating a semiconductor device includes growing a thin semiconductor film on a semi-insulating substrate, defining a semiconductor mesa with a desired lateral dimension by removing a portion of the thin semiconductor film, and depositing metal onto the substrate to form a metal shunt adjacent the semiconductor mesa with a desired lateral dimension.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

A new effect discovered in an inhomogeneous or hybrid semiconductor device has immediate applications in strain, pressure and temperature sensing. The effect involves an observed piezoconductance under tensile strain that is five times greater than that observed in a homogeneous device (~8% compared with 1.5%). The results were obtained using an apparatus applying a uniaxial tensile strain at temperatures between 4 K and 300 K and in fields up to 7 T, which was designed and built as discussed in A. C. H. Rowe et al., "A uniaxial tensile stress apparatus for temperature-dependent magnetotransport and optical studies of thin films," Rev. Sci. Instr., vol. 73, no. 12, pp. 4270–4276, December 2002. The apparatus allows for both optical and electrical measurement of the device under test. All experiments were carried out at room temperature, and the devices were tested to breaking point.

Figure 1:
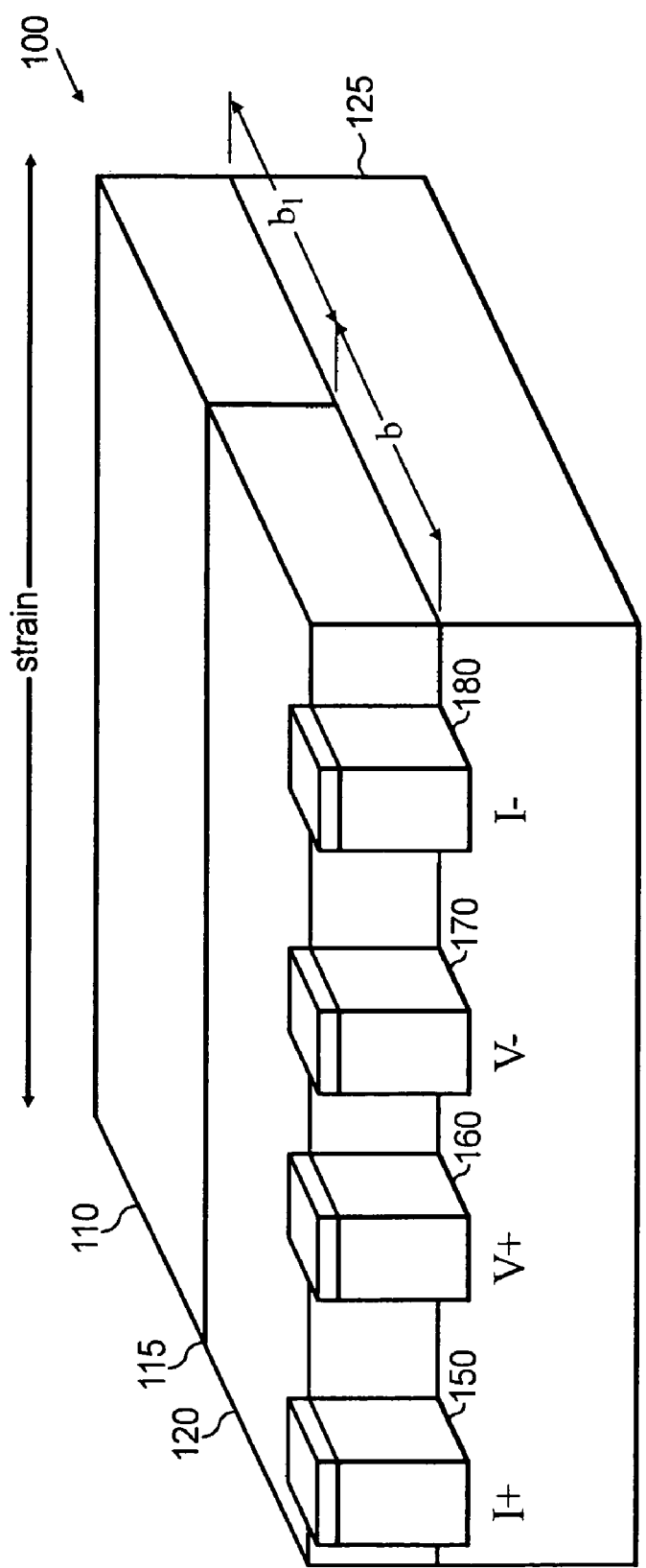
FIG. 1 illustrates a perspective view of a metal-semiconductor hybrid device according to the invention.
Figure 2:
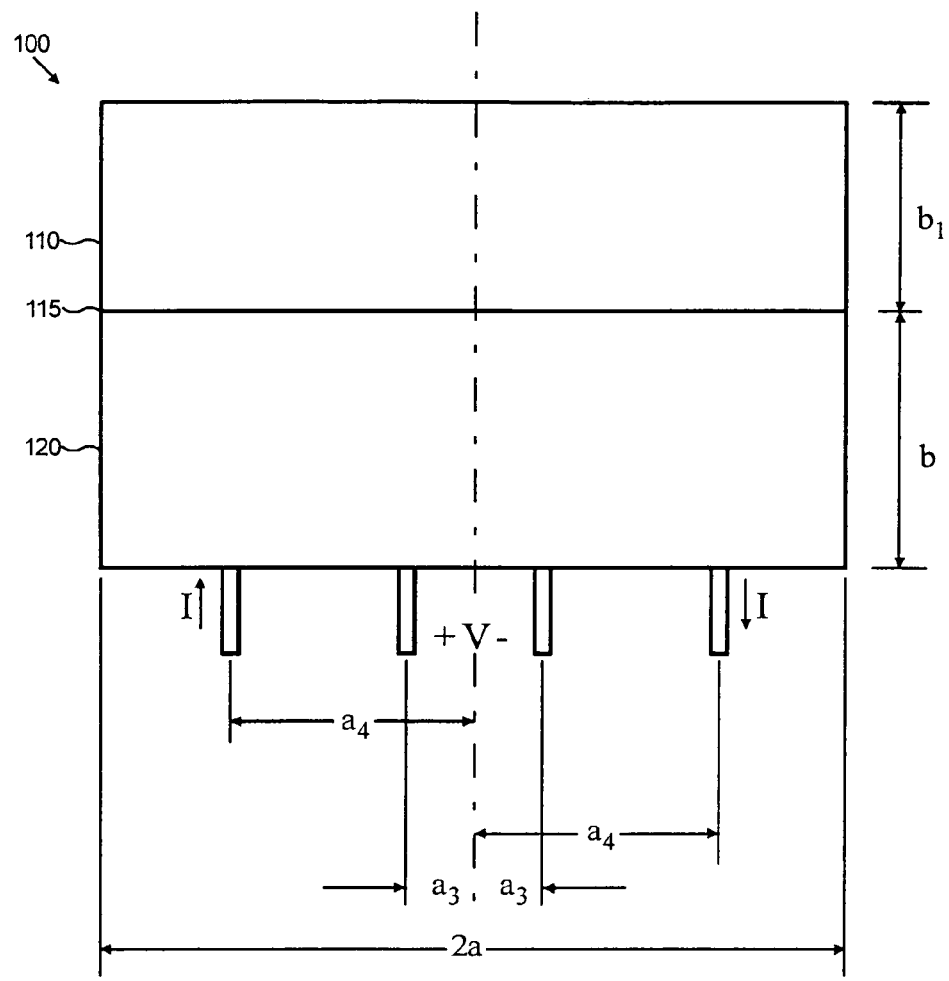
FIG. 2 illustrates a top view of a metal-semiconductor hybrid device according to the invention.

The extraordinary magnetoresistance (EMR) plates tested are of the type shown in FIGS. 1 and 2. FIG. 1 illustrates a perspective view of such a hybrid semiconductor device 100, which includes a semiconductor film 120 and an external metal shunt 110. Current electrodes 150 and 180 are used to apply a constant current to the device 100, while voltage electrodes 160 and 170 are used to measure a resulting voltage in the device. Optionally, a voltage can be measured between a single voltage electrode and one of the current electrodes 150 and 180. The shaded regions denote conductive material. The hybrid semiconductor device 100 includes an insulating substrate 125 on which the semiconductor film 120 and metal shunt 110 are carried and grown. Note that FIG. 1 is not to scale, as the substrate 125 is much thicker than the semiconductor layer 120 and metal shunt 110. A strain is induced in a direction that is parallel to the length of the interface 115.

The semiconductor film 120 may comprise a thin film bulk n-type semiconductor. In our case, we used n-type InSb grown on a semi-insulating (S.I.) GaAs substrate 125. A semi-insulating silicon substrate may also be used. In particular, samples were made from metal organic vapor phase epitaxy-grown epilayers of Te-doped n-type Indium Antimonide (InSb) with a 300 K mobility of ~40,000 cm$^2$/Vs and a carrier concentration of ~2×10$^{16}$ cm$^{-3}$. A buffer layer of 200-nm undoped n-type InSb was grown on a 4-inch semi-insulating GaAs substrate with a crystal orientation of (100) and a resistivity of 1×10$^{15}$ ohm·m. The substrate 125 may have thickness of 500–600 µm, for example. A 1.3 µm active layer of InSb with an electron concentration n=2.6×10$^{22}$ m$^{-3}$ and mobility µ=4.55 m$^2$Vs, was deposited on the buffer layer and capped by a 50-nm InSb contacting layer (n~1.5×10$^{23}$ m$^{-3}$). The substrate material 125 should be insulating and thus play no role in the piezoconductive effect. The electrically active thin film 120 will typically be of order 1 micron in thickness, although this is not essential. For example, a film thickness of approximately 1–10 microns may be used. Any n-type semiconducting thin film that forms an interface barrier with metals can be used. As an alternative to InSb, a high mobility narrow gap semiconductor such as Hg$_{1-x}$Cd$_x$Te may be used. A wide gap semiconductor may also be used. Possibilities include Si, GaAs, HgCd, InSb$_{1-x}$Te$_x$, InAs, and InAs$_{1-x}$Sb$_x$. Other group III–V semiconductor materials may also be used.

The surface InSb doping layer ensures the formation of very low resistance Ohmic surface contacts 150, 160, 170 and 180. Measures are taken to ensure that the surface doping layer does not contribute to parallel conduction (see D. L. Partin et al., Sensors and Actuators A vol. 69, p. 39 (1998)). Moreover, to obtain the full effect of the electrical short provided by the metal shunt 110, the metal should be the same thickness as the semiconductor film 120, which is formed as a mesa.

The metal-semiconductor hybrid device 100 may be fabricated using the following steps:

1) Using a semi-insulating substrate (typically 500–600 microns thick, examples of which include semi-insulating GaAs or semi-insulating silicon), and growing via molecular beam epitaxy (MBE) or metal-organic chemical vapor phase deposition (MOCVD) an n-type semiconducting thin film of thickness between 1–10 microns. We used n-type InSb grown on S.I. GaAs.

2) At this stage, the wafer will typically be several inches in diameter, and will include a contiguous 1–10 micron layer of the electrically active semiconducting thin film over the whole surface. A standard photolithographic process may be used for defining the semiconductor mesa part of the hybrid device. This involves:

2a) Spin on a positive photoresist to the top (electrically active) surface of the wafer, and harden the resist in an oven.

2b) Expose the hardened resist to ultra-violet light through a 'mesa' mask which contains a rectangular opaque structure of the desired semiconductor mesa dimensions. The shape and size of the mesa can be chosen at will—in our case the measured mesas were rectangles.

2c) Develop the photoresist using standard photoresist developer so that the only remaining photoresist is that which was covered by the opaque rectangle in the previous step.

2d) Create the mesas by etching away the remaining unwanted portion of the semiconducting thin film. Dry (or reactive ion) etch the uncovered semiconductor layer using an appropriate dry etch which will not attack the substrate material. The etch process should be anisotropic to cleanly define the vertical walls of the mesa. A wet chemical etch should not be used because of the attendant sidewall undercut.

2e) Dissolve the photoresist in acetone. What remains is a rectangular mesa structure of lateral dimension equal to that defined by the previous mask step, and of height 1–10 microns consistent with the thickness of the semiconducting thin film grown on the semi-insulating substrate.

3) Re-spin on photoresist and harden using the same process as above.

4) Expose to ultra-violet light through a 'metals' mask which is mostly opaque, but which contains cutout sections that define the current and voltage leads as well as the metallic shunt. Ensure that the mask is properly aligned so that the current and voltage leads lie along one side of the pre-defined semiconductor mesa, and the metallic shunt lies along the opposite side. This mask defines simultaneously the surface contacts (for application of current and measurement of voltage) and the metallic part of the metal-semiconductor hybrid structure. The location of the surface contacts and size and shape of the metal component of the hybrid structure can be chosen at will. In our case, the surface contacts 150, 160, 170 and 180 are arrayed along one side of the semiconductor mesa 120, and the metal component 110 of the hybrid device 100 is a rectangular block (FIG. 1) that contacts the mesa along a vertical sidewall.

5) Develop the resist in a photoresist developer. What remains is mainly resist, but with cutouts placed appropriately for the current and voltage contacts, and for the metallic shunt.

6) Deposit metal (in our case a titanium/platinum/gold combination) onto the substrate using an electron-beam or thermal evaporator. Highly conductive metals such as gold, copper or aluminum should be used. Conductive materials that may be used include Si, Fe, Cr, Ni, GaAs, InAs, InAsSb, Ag, Cu, Mo, W, Y, Ti, Zr, Hf, V, Nb, Pt or Ta. If necessary, a thin layer of adhesion promoter (such as chromium) and a diffusion blocker (such as platinum) should be deposited prior to the main metals deposition. Ensure an oblique angle of incidence for the evaporating metal relative to the wall of the semiconductor mesa that will form the metal/semiconductor interface. This is required in order to ensure good metal coverage at the metal/semiconductor interface.

7) Lift off the photoresist using acetone. What remains are four electrical contacts along one side of the semiconductor mesa, and a metallic shunt of lateral dimensions given by the mask, and of height between 1–10 microns and equal to the height of the semiconductor mesa. It is important that the metallic shunt be the same height as the semiconducting mesa in order to obtain the full effect of the shunt.

This hybrid metal-semiconductor device will then resemble the device of FIG. 1. This device, which consists of the semiconducting mesa 120 and the metallic shunt 110, sits on the semi-insulating substrate 125. Later, the opposite face of this substrate may be glued (using standard glues used to attach strain gauges to objects) to a membrane for use as a pressure gauge, as discussed below.

Generally, the conductive properties of the hybrid semiconductor device 100 depend upon the lead or electrode positions and widths, and the metal-to-semiconductor volume ratio. This is expressed in a quantity known as the filling factor, hereafter defined as α. FIG. 2 illustrates a top view of the EMR plate or metal-semiconductor hybrid device 100, where b is a width of the semiconductor film 120, $b_1$ is a width of the metal, 2a is a length of the device 100, $a_4$ is a distance from a centerline between the voltage electrodes 160 and 170 to either of the current electrodes 150 and 180, and $a_3$ is a distance between the centerline and either of the voltage electrodes 160 and 170. In all cases, $a_4$=2.1 mm, $a_3$=0.52 mm and 2a=5 mm. The respective values for b and $b_1$ (in mm) at each filling factor are listed in Table 1.

TABLE 1

| b (mm) | $b_1$ (mm) | α |
| --- | --- | --- |
| 1 | 0 | 0/16 |
| 0.883 | 2.5 | 6/16 |
| 0.5 | 1.5 | 8/16 |
| 0.389 | 1.2 | 9/16 |
| 0.3 | 1.5 | 10/16 |
| 0.227 | 1.135 | 11/16 |
| 0.167 | 0.835 | 12/16 |
| 0.115 | 0.575 | 13/16 |
| 0.071 | 0.353 | 14/16 |
| 0.033 | 0.166 | 15/16 |

The values in Table 1 were obtained from the following relationship, which applies to a rectangular plate geometry, as discussed in the T. Zhou et al. article, mentioned previously.

$$\alpha \equiv \frac{a_4}{1+\sqrt{2}} \sqrt{1 + \frac{2a_4}{(1+\sqrt{2})b_1}} \bigg/ \left[\left(1 + \frac{a_4}{(1+\sqrt{2})b_1}\right) \times \left(b + \frac{a_4}{1+\sqrt{2}}\right)\right]$$

In circular geometry devices, the filling factor is a ratio of the metal radius to the semiconductor radius. The filling factor is mentioned further in connection with FIGS. 6–8.

Figure 3:
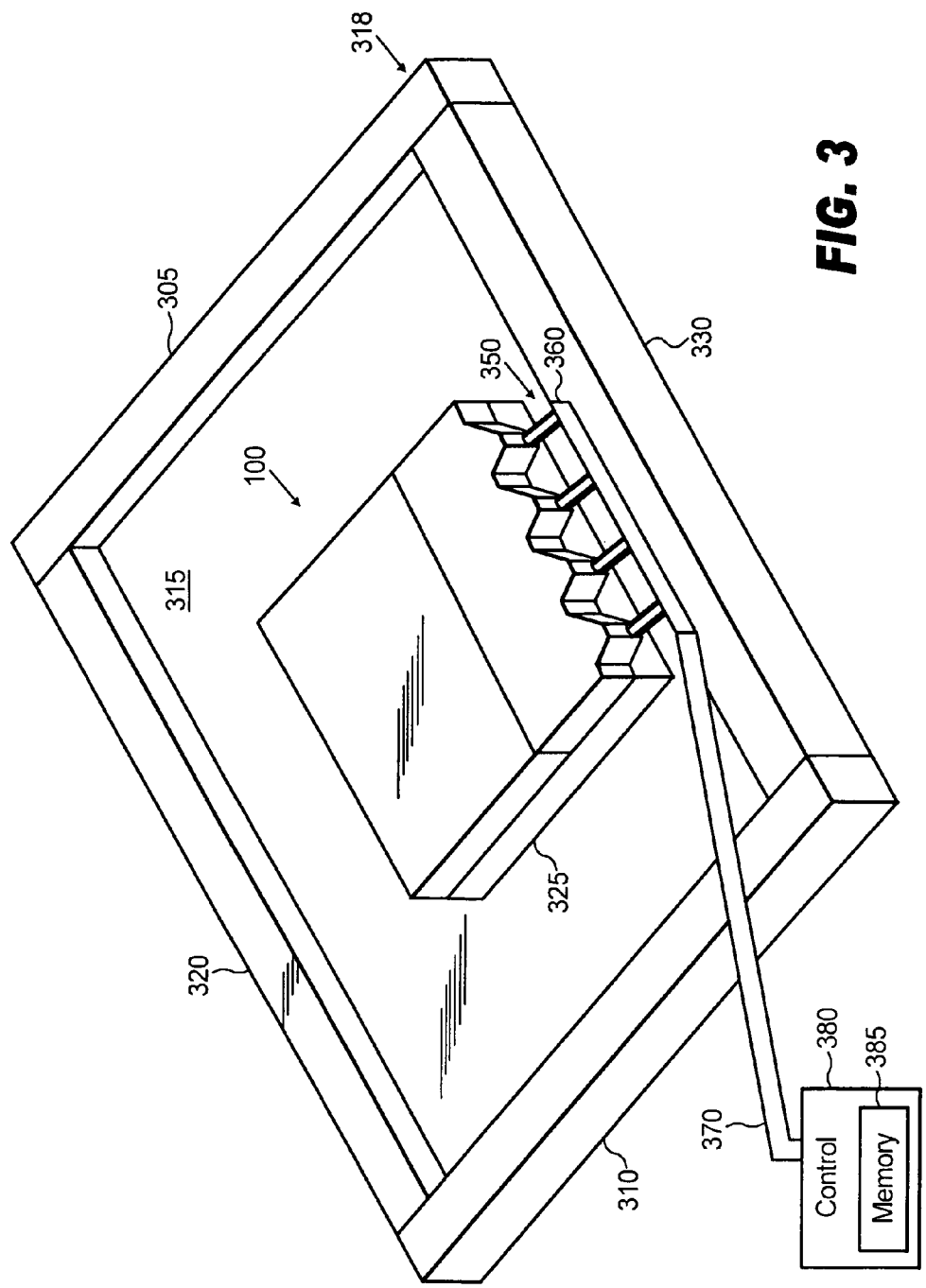
FIG. 3 illustrates a perspective view of a sensor according to the invention.

FIG. 3 illustrates a sensor 300 that uses the hybrid semiconductor device 100 mounted on a flexible membrane 315 using adhesives common to the strain gauge industry. These are adhesives that elastically deform under strain, thereby transferring all of the membrane strain to the hybrid semiconductor device 100. One supplier of such adhesives is Tokyo Sokki Kenkyujo Co. Ltd., Tokyo, Japan. Note that the selection of membrane material will depend on the application, as outlined below. One possibility is to use a thin piece of metal, although other materials are also possible. The use of silicon as the membrane material can be highly advantageous since the hybrid semiconductor device 100 can be fabricated, using the above steps, directly onto the membrane 315.

The membrane 315 may be mounted in a mounting bracket 318 that includes rigid portions 305 and 310, which may be made of metal, for example, and flexible portions 320 and 330, which may be made of plastic, for example. The portions 320 and 330 are relatively flexible or deformable so that they can expand and contract to allow the membrane 315 and the hybrid semiconductor device 100 to expand and contract in a direction parallel to the lengths of the portion 320 and 330. The expansion and contraction is also substantially parallel to the length of the interface 115. The rigid portions 305 and 310 are relatively non-deformable so practically no deformation is transferred to the hybrid semiconductor device 100 in a direction parallel to the respective lengths of the portions 305 and 310. In this manner, a uniaxial strain is induced in the hybrid semiconductor device 100. However, it is also possible to use rigid material for all sides of the mounting bracket 318 to induce a biaxial strain. For example, two hybrid semiconductor devices may be mounted orthogonally so that each is responsive to strain in a different direction. Or, biaxial strain may be induced in one hybrid semiconductor device. This may increase the magnitude of EPC in the device. Generally, a deformation or strain in the membrane 315 induces a corresponding deformation or strain in the hybrid semiconductor device 100.

The membrane 315 may be attached to the mounting bracket 318 in various ways. For example, the membrane 315 may be sandwiched between upper and lower parts of the mounting bracket 318, or adhered to the mounting bracket 318 using adhesive. For pressure sensing applications, the membrane 315 should be secured to the mounting bracket 318 in an airtight manner. The mounting bracket 318 itself should also be capable of forming a vacuum seal for use in sensing pressure. Electrical connection of the hybrid device 100 to the outside world can be achieved in various ways—for example, wire bonding using wires 350 to a terminal 360 on the mounting bracket 318. Or, conductive leads may be provided on the membrane 315 itself. Such leads should be lightweight and not place a load on the membrane 315. If the membrane 315 is conductive, such leads should be insulated from the membrane 315. The terminal 360 is connected to a control 380 and memory 385 via a cable 370. The control 380 and memory 385 may be specified and configured to achieve the functionality described herein, including supply current to the device 100, reading a voltage in the device 100, and storing calibration data.

Figure 4A:
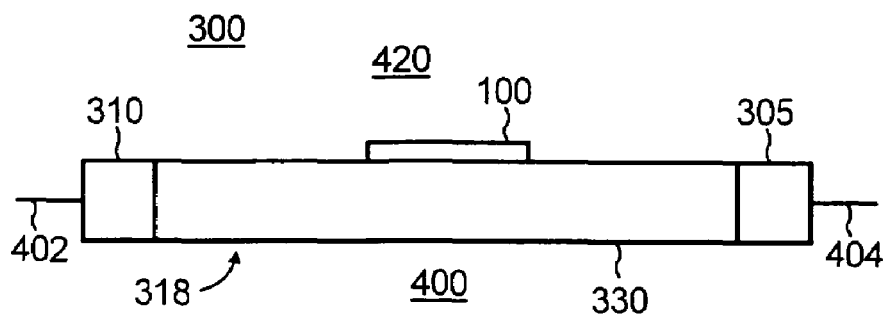
FIG. 4A illustrates a profile view of an undeformed sensor at ambient conditions according to the invention.
Figure 4B:
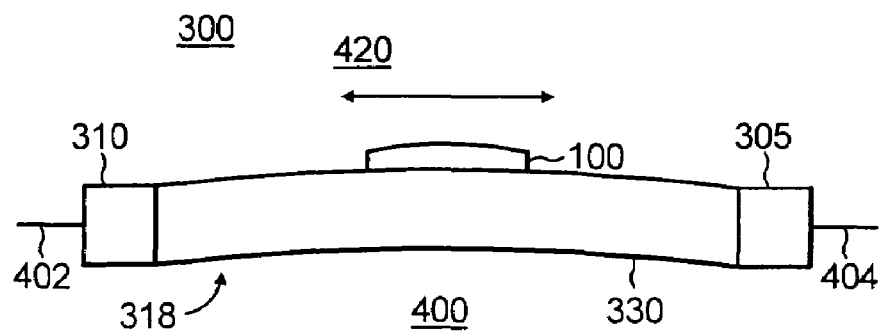
FIG. 4B illustrates a profile view of a sensor under tensile strain due to pressure according to the invention.

The sensor 300 may be used in various applications, including pressure and temperature sensing. For pressure sensing, the flexible membrane 315 acts as a force-gathering element. FIG. 4A illustrates a profile view of the sensor 300 at ambient conditions. For pressure sensing, a region 400 on one side of the sensor 300 is separated from a region 420 on the other side of the sensor 300 by the sensor 300 itself and appropriate air impervious elements 402 and 404, for instance. For example, assume it is desired to measure the pressure of an environment in the region 400, which acts on the sensor 300. Electrical connections to the control 380 may be provided as discussed in connection with FIG. 3. The sensor 300 is strain-free since the pressure in region 400 is the same as the pressure in region 420, so there is no induced strain in the hybrid semiconductor device 100. FIG. 4B illustrates the case where the pressure in region 400 is greater than the pressure in region 420. In this case, a uniaxial tensile strain is induced in the membrane 315 and in the hybrid semiconductor device 100 in a direction shown by the arrow. The level of strain that is induced should not result in long-term plastic deformation of the membrane 315.

The change in strain is detected by the control 380 as a change in the measured voltage in the hybrid semiconductor device 100. A tensile strain will decrease the effective resistance (increase the conductance) in the hybrid semiconductor device 100 due to enhanced piezoconductance, which is an interfacial phenomenon. The 'effective resistance' of the metal-semiconductor hybrid device 100 is measured by applying a current at the outer leads 150 and 180 of the device, and measuring the induced voltage on the inner two leads 160 and 170. The term 'effective resistance' is used since the injected current partly samples the semiconductor thin film mesa 120, and partly samples the metallic shunt 110. The strain induces a change in the interface layer at the vertical interface of height 1–10 microns between the semiconducting mesa 120 and the metallic shunt 110. In particular, tensile strain will reduce the impedance of this interface thereby allowing more of the injected current from the outer two leads to sample the metal. Since the conductivity of the metal is much larger than that of the semiconductor, even a small change in the amount of current sampling the metal will result in a large measurable change in the voltage (and hence the effective resistance) measured at the inner two leads. This is the enhanced piezoconductance effect.

Figure 4C:
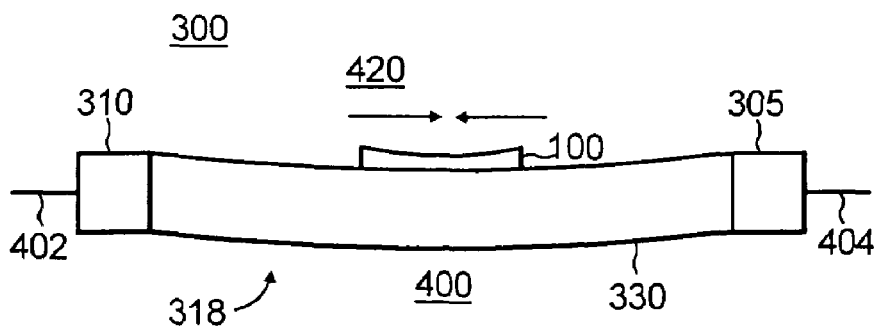
FIG. 4C illustrates a profile view of a sensor under compressive strain due to pressure according to the invention.

FIG. 4C illustrates the case where the pressure in region 400 is less than the pressure in region 420. In this case, a compressive strain is induced in the membrane 315 and hybrid semiconductor device 100 as shown by the arrow. A compressive strain will increase the effective resistance in the hybrid semiconductor device 100, causing a decrease in conductance and induced voltage. The change in voltage can then be correlated with the pressure differential between the region 400 and the region 420 that induces the strain in the sensor. For example, assuming the absolute pressure in one of the regions 400 or 420 is known, the absolute pressure in the other region can be obtained by subtracting the pressure differential. Or, if one of the regions 400 and 420 is known to have a constant pressure, the change in voltage can be correlated with the absolute pressure in the other region. Calibration data can be obtained using the calibration procedure discussed in connection with FIG. 9, for example. In one possible application, an alarm is set or other control action taken if the pressure exceeds a given level.

The sensor 300 may be considered to be a bonded hybrid metal-semiconductor sensor. Generally, a sensor using the hybrid semiconductor device 100 according to the invention yields an improved, cost-effective sensor compared with conventional sensors such as the bonded foil strain gauge (BFSG) pressure sensor. The article entitled "Rediscovering the Strain Gauge Pressure Sensor," available at www.sensormag.com, discusses the conventional bonded foil strain gauge (BFSG) pressure sensor, as well as providing further information regarding existing membrane and mounting technologies that may be used with a sensor according to the invention. In particular, the larger sensitivity of a sensor using the hybrid semiconductor device 100 compared with the BFSG (bulk metal or semiconducting sensor) means that: 1) thicker membranes can be used to detect smaller pressures because less flex in the membrane is required to register a signal (change of resistance) on the sensor; 2) signal levels will be similar to those of BFSG gauges because the surface contacts attach directly to the semiconductor (i.e., no disadvantage); and 3) For a large enough piezoconductance enhancement, differential (i.e., Wheatstone bridge) measurements may no longer be required. This would drastically reduce the complexity of the electrical detection circuit and therefore the overall size of the transducer. Moreover, hybrid semiconductor sensors maintain all of the design advantages of BFSGs, including accuracy, ease of packaging, and ability to withstand environmental forces.

Examples of current high volume applications for BFSGs where hybrid semiconductor sensors may be more suitable include measuring blood pressure, fuel injector pressure in automobiles, turbo manifold pressure in automobiles, blood alcohol level, and barometric pressure. Hybrid metal-semiconductor sensors may also be used in in-car comfort system applications, water pressure sensors for home hot water systems, underwater pressure sensors for dive watches and equipment, fluid delivery systems in hospitals such as dialysis machines and intravenous drip systems, HVAC systems, and vacuum cleaner pressure control. Sensors used in these applications must be robust in harsh environments. Sensitivity on the other hand tends to be somewhat limited for such sensors, compared for example with filament pressure sensors, ion gauges and the like. An EPC sensor of the present invention has immediate application in any of the above areas since it is as robust as homogeneous semiconductor materials and has the same dynamic range of measurable pressures, which is a substrate property, not an active layer property. However since the piezoconductivity is five times greater in EPC devices, as detailed further below, this translates into an immediate factor of five improvement in sensitivity. Put succinctly, EPC pressure sensors will enhance the sensitivity of semiconductor-type pressure sensors by a factor of five or more with no reduction in robustness or dynamic range.

The sensor 300 may also be used for temperature sensing. A temperature transducer can be fabricated as discussed above if the membrane material 315 has a known strain vs. temperature dependence characteristic, where a given change in temperature results in a calibrated change in the shape or dimensions of the membrane 315 and of the hybrid semiconductor device 100. Given this information, the hybrid semiconductor device 100 mounted on the membrane 315 becomes a strain based temperature sensor that exhibits a great improvement in sensitivity to temperature changes. Design of the transducer then depends upon selection of the membrane material for the required temperature range and application. Materials with the largest thermal expansion coefficients are desirable.

Figure 5A:
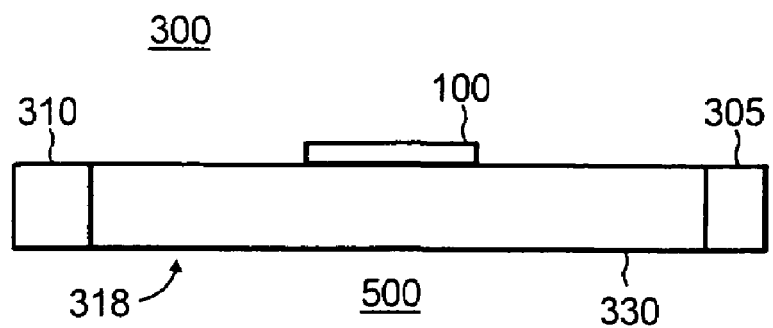
FIG. 5A illustrates a profile view of a sensor at a baseline state according to the invention.
Figure 5B:
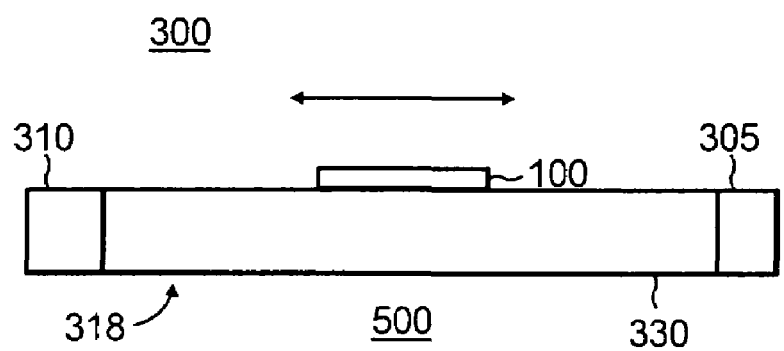
FIG. 5B illustrates a profile view of a sensor under tensile strain due to increased temperature according to the invention.
Figure 5C:
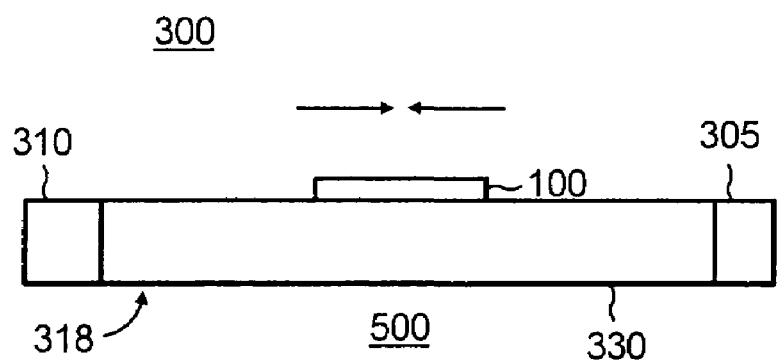
FIG. 5C illustrates a profile view of a sensor under compressive strain due to decreased temperature according to the invention.

For temperature sensing, the sensor 300 is simply exposed to the environment to be sensed. FIG. 5A illustrates a profile view of a sensor at a baseline state according to the invention. For example, the baseline state may be a baseline temperature, e.g., room temperature, at which there is no induced strain in the membrane 315 and hybrid semiconductor device 100. FIG. 5B illustrates a profile view of the sensor 300 under tensile strain due to a temperature decrease in the region 500, which represents the ambient region in which the sensor 300 is located. An increase in temperature causes the frame 318, membrane 315 and hybrid semiconductor device 100 to expand in size in the direction shown by the arrow, thereby inducing a tensile strain in the hybrid semiconductor device 100. FIG. 5C illustrates a profile view of the sensor under compressive strain due to a temperature increase in the region 500. A decrease in temperature causes the frame 318, membrane 315 and hybrid semiconductor device 100 to contract in size in the direction shown by the arrow. As with pressure sensing, the change in strain can be detected as a change in the measured voltage in the device 100. For example, the change in voltage can be correlated with either an absolute temperature, or a temperature differential relative to the baseline temperature. In the latter case, the absolute temperature can be obtained by subtracting the temperature differential. Calibration data can be obtained and subsequently accessed for this purpose.

In a further application, the hybrid semiconductor device 100 may be used for sensing strain, e.g., by attaching it to a surface on which strain is to be sensed using a suitable adhesive or other mounting technique, as a conventional strain sensor would be used. A strain induced on the surface is transferred to the hybrid semiconductor device 100, and the corresponding change in resistance is detected by the control 380.

Figure 6:
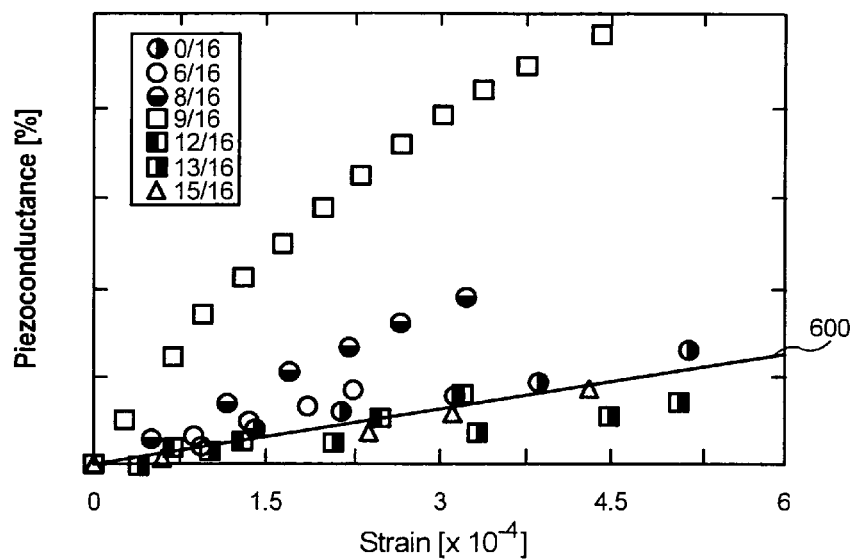
FIG. 6 illustrates a measured piezoconductance versus strain relationship in a metal-semiconductor hybrid device for different filling factors according to the invention.

Measured and calculated performance of the hybrid semiconductor device 100 is now discussed. FIG. 6 illustrates a measured piezoconductance versus strain relationship in a metal-semiconductor hybrid device for different filling factors according to the invention. The filling factor is discussed also in connection with FIG. 2. On the horizontal axis, tensile strain is a unitless measure defined as a change in length per unit undistorted length. On the vertical axis, piezoconductance (PC) is represented as a percent increase relative to the conductance with no induced strain in the hybrid semiconductor device 100. The data represented by individual symbols represents the PC increase for the hybrid semiconductor device 100 of the invention for several EMR plate designs with different filling factors. It is clear that for certain filling factors (e.g., 8/16, 9/16, 10/16) there is an enhancement of the PC above that of the homogeneous material. In particular, a filling factor of about 9/16 results in superior performance for the rectangular geometry. For comparison, the solid line 600 shows the measured piezoconductance (PC) percent increase with strain for the homogeneous InSb semiconductor film with no metal shunt. The results from three samples are shown for the homogeneous device, and the repeatability is good. Note that at a strain of $3 \times 10^{-4}$, the PC is increased almost 8% for the hybrid device compared to 1.5% for the homogeneous semiconductor film—a more than fivefold increase.

Room temperature four terminal resistance measurements were carried out at a fixed current of 1 mA using the lead or electrode configuration shown in FIG. 1, and the strain was gradually increased in the (001) crystal direction parallel to the interface 115, until the substrates broke. The strain was measured with a resolution of $1.5 \times 10^{-5}$ using an optical reflection technique, discussed in Rev. Sci. Instr., vol. 73, no. 12, mentioned above. The resistance is the four-terminal apparent or effective resistance, and the conductivity was calculated as the inverse of the resistance.

The slope of the quasi-linear PC versus strain curves of FIG. 6 is known as the gain factor and is a figure of merit for strain based pressure sensors. At $\alpha=9/16$, the gain factor is about 270, which greatly exceeds that of either metal foil gauges (with a gain factor of about 2) or homogeneous silicon gauges (with a gain factor typically about 20 but up to 100).

The sensitivity of the conductivity to the interface resistance implies that the hybrid semiconductor device 100 may prove useful in the electrical characterization of low resistance or low Schottky barrier metal-semiconductor interfaces which would otherwise be dominated by spreading resistance. Generally, the interface 115 formed between the semiconductor film 120 and the external metal shunt 110 may be a Schottky interface or resistive interface. In our experiments, we measured a resistive interface, which has a linear I–V characteristic, and a quasi-Fermi energy level that is greater than the conduction band edge energy level. However, a Schottky interface may also be used. A Schottky interface has an exponential I–V characteristic with a quasi-Fermi energy level that is less than the conduction band edge energy level. One would also expect an enhanced piezoconductance (possibly of even large magnitude) if a Schottky interface were present.

Figure 7:
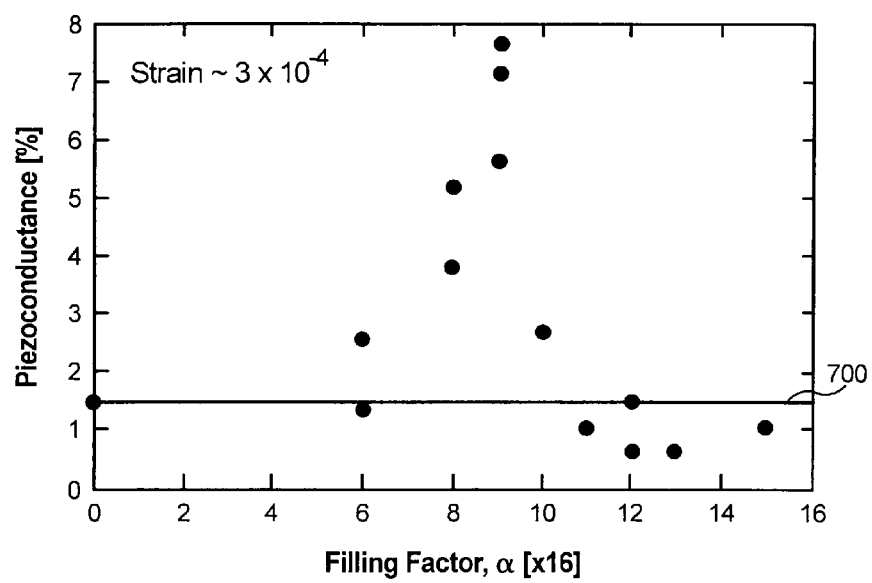
FIG. 7 illustrates a measured piezoconductance versus filling factor relationship in a metal-semiconductor hybrid device at a fixed strain level according to the invention.

FIG. 7 illustrates a measured piezoconductance versus filling factor relationship in the hybrid semiconductor device at a fixed strain level of $3 \times 10^{-4}$ according to the invention. The PC increase of 1.5% for the homogeneous device is represented by the line 700, while the PC increases for different filling factors with the hybrid semiconductor device 100 of the invention are represented by the dots in the plot. As can be clearly seen, there is a very large peak at a filling factor of $9/16$, and the maximum measured PC is approximately five times greater than the PC of the homogeneous material. Since the large magnetoresistance of these devices was named EMR, we call this enhancement of the PC, extraordinary PC (EPC).

The origin of the EPC is in the changes to the band structure of the semiconductor film under strain. Generally, the study of surface states and metal contacts on semiconductors is an old one, stretching back at least as far as Schottky, Zeitschr. Physik. vol. 118, p. 539 (1942). In spite of this, the details of Schottky barrier formation at a metal/semiconductor interface are still very poorly understood, and thus such barriers are still the subject of both experimental and theoretical research. See review, G. Margaritondo, Rep. Prog. Phys., vol. 62, 765 (1999). Recent work has shown that the barrier height at a metal/semiconductor interface, and thus the specific contact resistance, increases with increasing compressive strain, as discussed in C. S. Gworek et al., Phys. Rev. B 64, 045322 (2001). Thus, for small strains, the effect of tensile strain should be to reduce the specific contact resistance.

Moreover, while the effect is demonstrated in hybrid gold-n-type InSb (Indium Antimonide) structures previously shown to be useful in magnetic field sensing applications, other materials may provide a further optimization. In principle, any n-type semiconductor which readily forms a Schottky or resistive barrier whose potential height or resistance, respectively, is sensitive to externally applied strain should yield a similar, and possibly larger, piezoconductance. Examples common to semiconductor fabrication facilities might include gold-Si, gold-GaAs, Al—Si, and Al—GaAs. Note that p-type semiconductors will not work, as Schottky barrier heights are pinned relative to the valence band edge and therefore do not change with strain. Moreover, the effect will be larger with more conductive metals. For this reason, gold, aluminum, copper and the like are the preferred metallic materials for the shunt.

Device geometry also plays a major role in determining the magnitude of the effect. Geometry includes the location of the current and voltage leads, and the shape of the metal and semiconducting components of the hybrid structure. The geometries tested, which we refer to as "rectangular", are not optimized for maximum piezoconductance. Instead, the tested structures were optimized for EMR. EPC-optimized structures may yield piezoconductances greater than an order-of-magnitude better than homogeneous semiconductors. The design "rule of thumb" to maximize the geometric component of the piezoconductance is to maximize the length of the metal-semiconducting interface sampled by the applied current. Thus, other geometries may further enhance the PC. A trial and error process may be used to discover which geometries are best.

Moreover, as can be seen, the magnitude of the piezoconductance is strongly dependent on the unstrained sample geometry, and is largest for a filling factor of $9/16$. At small values of α, i.e., mostly semiconductor, the PC approaches 1.5%, the measured PC of the semiconductor alone. At large α, i.e., mostly metal, the PC approaches a value lower than 1.5% corresponding to the small but finite metal PC. The large peak at approximately 8% at intermediate values is reminiscent of the peak in the EMR plotted versus α for a circular geometry hybrid device. In fact, a linear trend has been observed between the PC and the magnetoresistance. That is, geometries that exhibit the largest (smallest) PC also exhibit the largest (smallest) magnetoresistance. However, unlike the EMR, which depends only on the location of the metal-semiconductor interface and may therefore be considered an intrinsic effect, the enhanced PC is an extrinsic effect dependent on both the location and properties of the metal-semiconductor interface. As tensile strain increases, the interface resistance decreases, admitting more current into the metal, thereby increasing the overall conductance.

Figure 8:
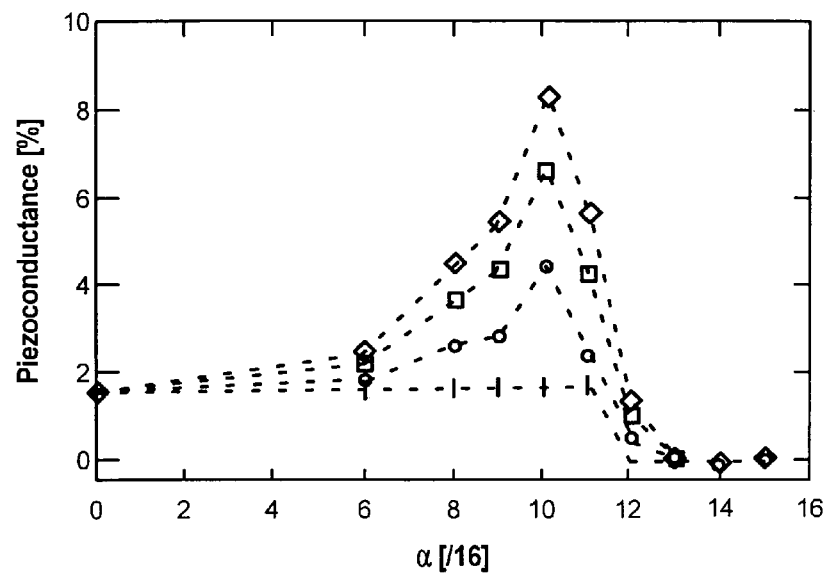
FIG. 8 illustrates a calculated piezoconductance versus filling factor relationship in a metal-semiconductor hybrid device at a fixed strain level according to the invention.

FIG. 8 illustrates a calculated piezoconductance versus filling factor relationship in a metal-semiconductor hybrid device at a fixed strain level according to the invention. The results were obtained from a finite element calculation that takes into account both changes to the device geometry under a strain of $3 \times 10^{-4}$, and introduces a resistive interface barrier at the metal/semiconductor interface whose conductance increases with increasing tensile strain. A barrier width of 0.3 μm is chosen, which is approximately equal to the electron mean free path in InSb at 300 K. Several points should be understood from this figure. Firstly, the effect of changes to the geometry alone cannot account for the observed EPC—the peak in the calculated PC versus filling factor curve exists, but its amplitude is too small relative to that of the data. This is represented by the symbols whose legend refers to "no barrier." The amplitude of the peak is, however, very sensitive to the presence of an interface barrier, and the changes to the conductive properties of this interface barrier with strain. The specific resistance of the barrier is taken to be $10^{-5}$ Ohm-cm$^2$, a reasonable value for a metal/InSb interface. Shown are calculations for no barrier (+), and a 3% (O), 5% ( ), and 6.5% (◊) reduction in the barrier resistance. A reduction in the barrier resistance of around 5–6.5% yields a peak height that roughly matches the measured data of FIG. 7.

It should be noted that the barrier is unlikely to be purely resistive (a Schottky barrier exhibits diode-like behavior) even though the barrier heights are small for InSb (see C. A.

Mead et al., Phys. Rev. 134, A713 (1964)), so the model will not capture all the observed behavior. For example, the experimental peak in the EPC occurs for a filling factor of $9/16$ while the model predicts a peak at $10/16$. However, the model qualitatively demonstrates that EPC is a result of changes to the metal/semiconductor interface properties modulated by changes in the geometry of the device.

Figure 9:
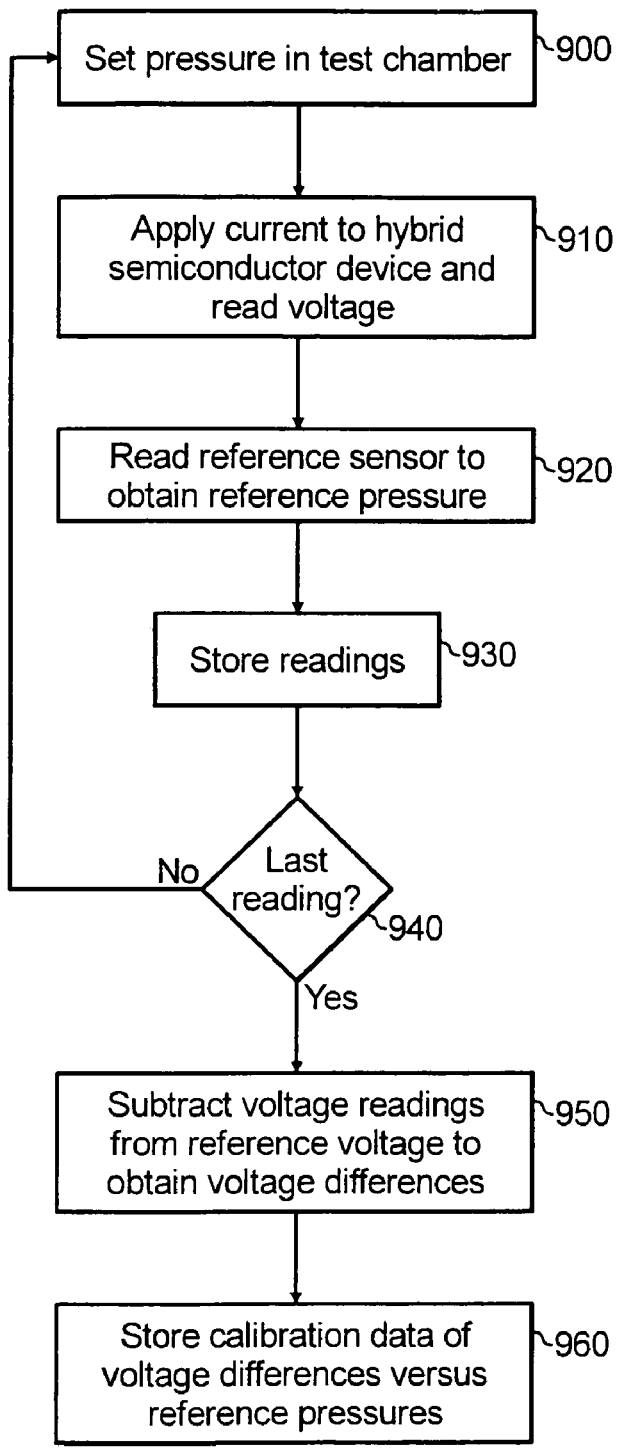
FIG. 9 illustrates a method for calibrating a sensor according to the invention.
Figure 3:
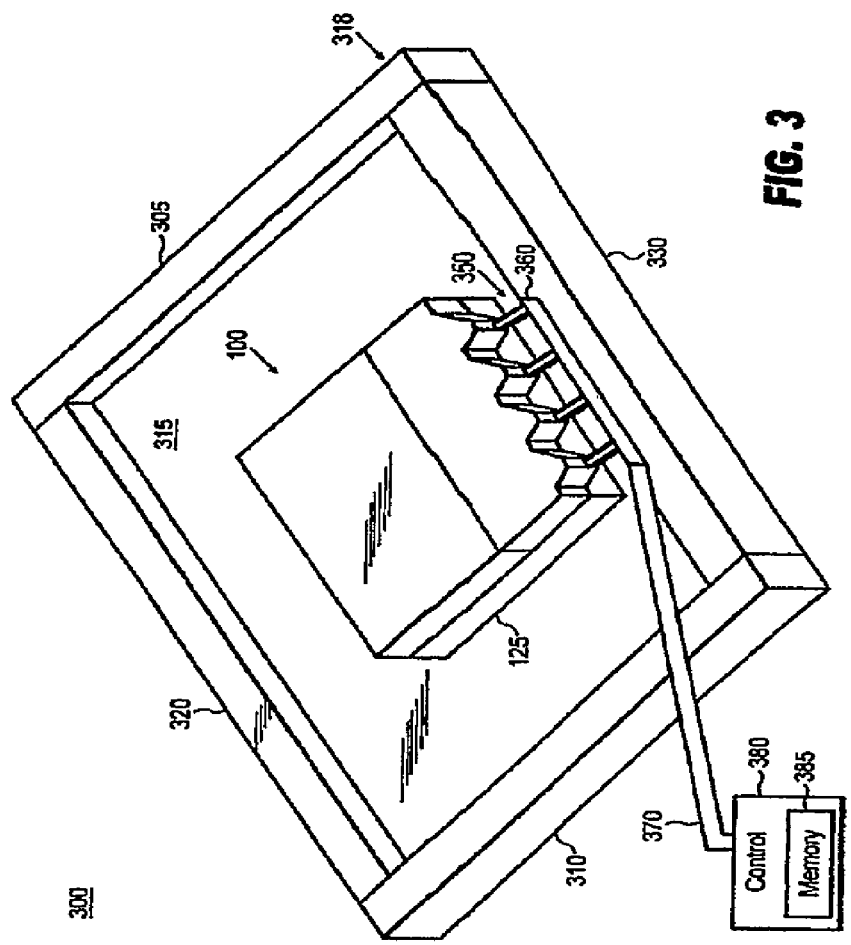
Figure 6:
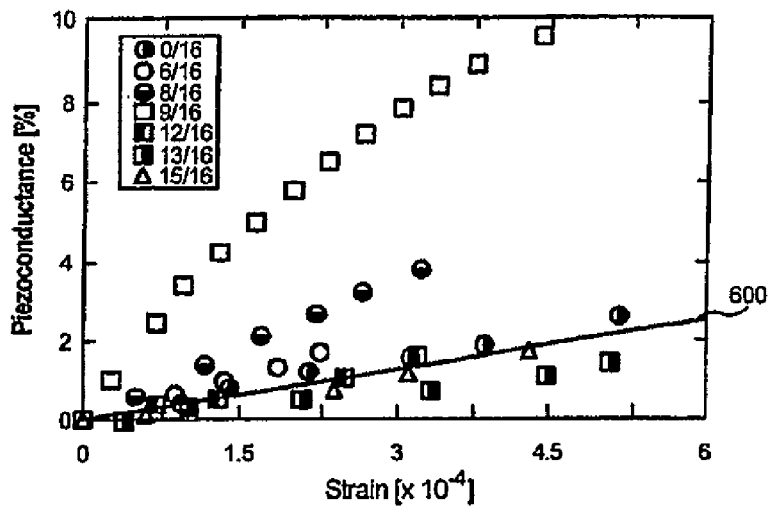

FIG. 9 illustrates a method for calibrating a sensor according to the invention. In practice, the sensor can be calibrated by obtaining voltage measurements at different environmental conditions, e.g., pressures and/or temperatures, and correlating the readings with known conditions, e.g., as obtained from a highly accurate reference sensor. For example, for pressure readings, a filament sensor may be used. Referring to FIGS. 4A–4C, assume the region 400 represents the environment of a test chamber. At block 900 in FIG. 9, the pressure is set in the test chamber to an initial level. At block 910, the fixed current is applied to the semiconductor device to induce a voltage, and a reading of the voltage is taken. The first voltage reading may be a reference voltage for the following readings. At block 920, the reference sensor is read to obtain a reference pressure. At block 930, the readings are stored. At block 930, the process is repeated to obtain additional readings from the hybrid semiconductor device and the reference sensor at different pressures. At block 950, voltage differences are obtained by subtracting the voltage readings from the reference voltage and, at block 960, calibration data is obtained from the relationship of the voltage differences versus the reference pressures. This data may be accessed for subsequent use with the sensor to correlate a differential voltage with a pressure. Optionally, the calibration data correlates the absolute voltage measurements with the pressure. A similar process may be undertaken to obtain calibration data of voltage versus temperature or temperature differential by using a reference temperature sensor.

In another approach, the sensor can be calibrated against a strain gauge by applying loads that induce a known strain in the sensor and obtaining voltage measurements at the different induced strains/applied loads. A calibration curve of applied load or induced strain versus voltage or voltage differential can therefore be obtained.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. An apparatus for measuring strain, comprising:
   a semiconductor film and an adjacent metal shunt forming a first interface between the semiconductor film and the adjacent metal shunt, the semiconductor film and metal shunt being deposited on a substrate;
   wherein a strain induced at least at the first interface in a direction that is parallel to a length of the first interface changes a resistance of the semiconductor film;
   the first interface is located vertically to the substrate and along adjacent side walls of the semiconductor film and the adjacent metal shunt; and
   a plurality of metal contacts forming a plurality of secondary interfaces with the semiconductor film on an opposite side of the metal shunt thereby allowing detection of the change in the resistance of the semiconductor film, the plurality of secondary interfaces being resistive interfaces.

2. The apparatus of claim 1, wherein: the induced strain comprises a tensile strain.

3. The apparatus of claim 1, wherein: the induced strain comprises a compressive strain.

4. The apparatus of claim 1, wherein: the first interface comprises a resistive interface.

5. The apparatus of claim 1, wherein: the first interface comprises a Schottky interface.

6. The apparatus of claim 1, wherein: the semiconductor film comprises an n-type thin film with a thickness of approximately one to ten microns.

7. The apparatus of claim 1, wherein: the semiconductor film comprises Indium Antimonide.

8. The apparatus of claim 1, wherein: the metal shunt comprises gold.

9. The apparatus of claim 1, further comprising: a flexible membrane on which the semiconductor film and metal shunt are carried.

10. The apparatus of claim 9, further comprising: a frame to which the flexible membrane is attached.

11. The apparatus of claim 1, further comprising: a semi-insulating substrate on which the semiconductor film and metal shunt are grown.

12. The apparatus of claim 1, wherein: a plate structure is formed by the semiconductor film and the metal shunt in which the semiconductor film and metal shunt extend laterally away from the first interface.

13. The apparatus of claim 1, further comprising: a control for obtaining a measurement indicative of the change in the resistance of the interface by applying a constant current to the semiconductor film through a first subset of metal contacts of the plurality of metal contacts to induce a voltage therein, and measuring a change in the voltage that is indicative of the change in the resistance, the measurement being performed across a second subset of metal contacts of the plurality of metal contacts.

14. The apparatus of claim 13, wherein: the control determines at least one of a pressure and temperature based on the obtained measurement.

15. The apparatus of claim 14, further comprising: a memory for storing calibration data; wherein the control accesses the calibration data for use in determining the at least one of a pressure and temperature.

16. The apparatus of claim 1, wherein: the strain is induced in a direction substantially parallel to a length of the interface.

17. The apparatus of claim 12, wherein: heights of the semiconductor film and metal shunt in the plate structure are substantially equal.

18. A method for measuring strain, comprising:
   applying a constant current to a hybrid semiconductor device to induce a voltage, the hybrid semiconductor device comprising a semiconductor film and an adjacent metal shunt forming a first interface between the semiconductor film and the adjacent metal shunt, the semiconductor film and metal shunt being deposited on a substrate, and the first interface being located vertically to the substrate and along adjacent side walls of the semiconductor film and the adjacent metal shunt, and a plurality of metal contacts forming a plurality of secondary interfaces with the semiconductor film on an opposite side of the metal shunt thereby allowing detection of the change in the resistance of the semiconductor film, the plurality of secondary interfaces being resistive interfaces;

inducing a strain at least at the first interface in a direction parallel to a length of the first interface to change a resistance of the semiconductor film; and measuring a change in the induced voltage that is indicative of the change in the resistance.

19. The apparatus of claim 1, further comprising: contacts arranged on the semiconductor film for applying a current to the semiconductor film and the adjacent metal shunt, and for measuring a change in an induced voltage that is indicative of a change in a resistance at the interface.

20. The apparatus of claim 19, wherein: the contacts are arranged on a side wall of the semiconductor film opposite to the interface.

21. The apparatus of claim 11, wherein: the semiconductor film comprises a mesa grown on the semi-insulating substrate.

22. The apparatus of claim 12, wherein: the plate structure has a filling factor of approximately 9/16.

23. The apparatus of claim 1, wherein: a filling factor is approximately 9/16.

24. An apparatus for measuring strain, comprising:
a semiconductor film and an adjacent metal shunt forming a first interface between the semiconductor film and the adjacent metal shunt, the semiconductor film and metal shunt being deposited on a substrate, and a plurality of metal contacts forming a plurality of secondary interfaces with the semiconductor film on an opposite side of the metal shunt thereby allowing detection of the change in the resistance of the semiconductor film, the plurality of secondary interfaces being resistive interfaces;

wherein a strain induced at least at the first interface in a direction parallel to a length of the first interface changes a resistance of the semiconductor film; and the semiconductor film comprises Indium Antimonide.

25. An apparatus for measuring strain, comprising:
a semiconductor film and an adjacent metal shunt forming a first interface between the semiconductor film and the adjacent metal shunt, the semiconductor film and metal shunt being deposited on a substrate, and a plurality of metal contacts forming a plurality of secondary interfaces with the semiconductor film on an opposite side of the metal shunt thereby allowing detection of the change in the resistance of the semiconductor film, the plurality of secondary interfaces being resistive interfaces;

wherein a strain induced at least at the first interface in a direction parallel to a length of the first interface changes a resistance of the semiconductor film; and a plate structure is formed by the semiconductor film and the metal shunt in which the semiconductor film and metal shunt extend laterally away from the first interface.

26. An apparatus for measuring strain, comprising:
a semiconductor film and an adjacent metal shunt forming a first interface between the semiconductor film and the adjacent metal shunt, the semiconductor film and metal shunt being deposited on a substrate;

wherein a strain induced at least at the first interface in a direction parallel to a length of the first interface changes a resistance of the semiconductor film; and a plurality of metal contacts forming a plurality of secondary interfaces with the semiconductor film on an opposite side of the metal shunt for applying a current to the semiconductor film and the adjacent metal shunt, and for measuring a change in an induced voltage that is indicative of a change in a resistance at the first interface.

27. The apparatus of claim 26, wherein: the contacts are arranged on a side wall of the semiconductor film opposite to the first interface.

28. An apparatus for measuring strain, comprising:
a semiconductor film and an adjacent metal shunt forming a first interface between the semiconductor film and the adjacent metal shunt, the semiconductor film comprises a mesa grown on a semi-insulating substrate, and a plurality of metal contacts forming a plurality of secondary interfaces with the semiconductor film on an opposite side of the metal shunt thereby allowing detection of the change in the resistance of the semiconductor film, the plurality of secondary interfaces being resistive interfaces; and wherein a strain induced at least at the interface in a direction parallel to a length of the interface changes a resistance of the semiconductor film.

29. An apparatus for measuring strain, comprising:
a semiconductor film and an adjacent metal shunt forming a first interface between the semiconductor film and the adjacent metal shunt, the semiconductor film and metal shunt being deposited on a substrate, and a plurality of metal contacts forming a plurality of secondary interfaces with the semiconductor film on an opposite side of the metal shunt thereby allowing detection of the change in the resistance of the semiconductor film, the plurality of secondary interfaces being resistive interfaces; and a filling factor of approximately 9/16;

wherein a strain induced at least at the first interface in a direction parallel to a length of the interface changes a resistance of the semiconductor film.

* * * * *

UNITED STATES PATENT AND TRADEMARK OFFICE
CERTIFICATE OF CORRECTION

PATENT NO. : 7,082,838 B2
APPLICATION NO. : 10/626403
DATED : August 1, 2006
INVENTOR(S) : Rowe et al.

It is certified that error appears in the above-identified patent and that said Letters Patent is hereby corrected as shown below:

The drawing sheet, consisting of Fig. 3 and 6, should be deleted and replaced with drawing sheet, consisting of Fig. 3 and 6, as shown on the attached page.

Signed and Sealed this

Twentieth Day of February, 2007

JON W. DUDAS
*Director of the United States Patent and Trademark Office*